(12) United States Patent
Esveldt

(10) Patent No.: US 8,973,600 B2
(45) Date of Patent: Mar. 10, 2015

(54) VALVE

(75) Inventor: Vincent Esveldt, DR Werkendam (NL)

(73) Assignee: MOKVELD Valves B. V., AJ Gouda (NL)

( * ) Notice: Subject to any disclaimer, the term of this patent is extended or adjusted under 35 U.S.C. 154(b) by 0 days.

(21) Appl. No.: 13/314,262

(22) Filed: Dec. 8, 2011

(65) Prior Publication Data

US 2013/0068976 A1 Mar. 21, 2013

Related U.S. Application Data

(63) Continuation of application No. PCT/EP2010/058005, filed on Jun. 8, 2010.

(30) Foreign Application Priority Data

Jun. 9, 2009 (DE) .......................... 10 2009 026 838

(51) Int. Cl.
| | | |
|---|---|---|
| *F16K 1/12* | (2006.01) | |
| *F16K 31/04* | (2006.01) | |
| *F16K 47/08* | (2006.01) | |
| *F16K 37/00* | (2006.01) | |

(52) U.S. Cl.
CPC .................. *F16K 31/047* (2013.01); *F16K 1/12* (2013.01); *F16K 31/04* (2013.01); *F16K 47/08* (2013.01); *F16K 37/00* (2013.01)
USPC ........................ 137/219; 251/355; 74/89.23

(58) Field of Classification Search
USPC ........ 137/219, 625.37–39; 251/355; 74/89.23
See application file for complete search history.

(56) References Cited

U.S. PATENT DOCUMENTS

| | | | | |
|---|---|---|---|---|
| 2,116,724 | A | * | 5/1938 | Horstmann et al. ........ 137/484.8 |
| 2,724,405 | A | * | 11/1955 | Stover ............................ 137/486 |
| 2,919,714 | A | * | 1/1960 | Mrazek .......................... 137/220 |
| 3,428,297 | A | * | 2/1969 | Volpin ........................... 251/355 |
| 3,588,652 | A | * | 6/1971 | Lewis ............................ 318/282 |
| 3,637,187 | A | * | 1/1972 | Burger .......................... 251/61.3 |

(Continued)

FOREIGN PATENT DOCUMENTS

| | | |
|---|---|---|
| DE | 3933169 A1 | 4/1991 |
| DE | 4214814 | 11/1993 |

(Continued)

OTHER PUBLICATIONS

EP 0434912 machine translation and figure, Fuchs, Lift Valve, Mar. 7, 1991, European Patent Office.*

*Primary Examiner* — John K Fristoe, Jr.
*Assistant Examiner* — Seth W MacKay-Smith
(74) *Attorney, Agent, or Firm* — Von Rohrscheidt Patents

(57) ABSTRACT

A valve with a housing including an inlet opening and an outlet opening for a fluid; a closure element through which a flow of the fluid is controllable; an actuation device including an electric actuator for adjusting a closure cross section of the closure element; a drive housing at which a stator of the electric actuator is fixated, wherein a moveable moving element of the electric actuator is kinematically coupled with the closure element in an inner cavity of the drive housing which is loaded with a pressure from the fluid, wherein the stator is disposed in the inner cavity, and wherein the inner cavity of the drive housing is separated from the fluid through a moveable divider element. In order to use a valve with an actuator disposed in an abrasive fluid the inner cavity of the drive housing is separated from the fluid through a moveable divider element.

14 Claims, 5 Drawing Sheets

(56) References Cited

U.S. PATENT DOCUMENTS

| | | | |
|---|---|---|---|
| 4,008,733 A * | 2/1977 | Courant et al. | 137/220 |
| 4,289,038 A | 9/1981 | Hore | |
| 4,494,731 A * | 1/1985 | Spils | 251/355 |
| 5,278,454 A * | 1/1994 | Strauss et al. | 307/64 |
| 5,497,672 A * | 3/1996 | Appleford et al. | 74/89.29 |
| 6,202,671 B1 * | 3/2001 | Horstmann | 137/219 |
| 6,742,539 B2 * | 6/2004 | Lyons | 137/219 |
| 6,783,107 B2 * | 8/2004 | Chatufale | 251/54 |
| 7,108,006 B2 * | 9/2006 | Armstrong | 137/14 |
| 7,353,837 B2 * | 4/2008 | Biester | 137/219 |
| 7,404,468 B2 * | 7/2008 | Kuo | 187/268 |
| 7,789,370 B2 * | 9/2010 | Eriksson | 251/71 |
| 2009/0072179 A1 * | 3/2009 | Swartzentruber et al. | 251/249.5 |

FOREIGN PATENT DOCUMENTS

| | | |
|---|---|---|
| DE | 102007007664 B3 | 3/2008 |
| DE | 102007037995 A1 | 2/2009 |
| EP | 1736693 | 12/2006 |
| JP | 62 295125 | 12/1987 |
| JP | H 11-082794 | 3/1999 |
| JP | 2001-141094 | 5/2001 |
| JP | 2005-114105 | 4/2005 |

* cited by examiner

VALVE

RELATED APPLICATIONS

This application is a continuation of International application PCT/EP2010/058005 filed on Jun. 8, 2010 claiming priority from German application DE 10 2009 026 838.3 filed on Jun. 9, 2009, both of which are incorporated in their entirety by this reference.

FIELD OF THE INVENTION

The invention relates to a valve with a housing including an inlet opening for a fluid, a closure element, through which a flow of the fluid is controllable, and an outlet opening for the fluid, and with a control device which includes an electric actuator for adjusting a closure cross section of the closure element, and with a drive housing, wherein a stator of the actuator is fixated to the drive housing, wherein a movable moving element of the actuator is coupled to the closure element in a kinematic manner and the stator is disposed within the inner cavity of the drive housing which is pressurized by a pressure of the fluid.

DE 42 14 814 A1 discloses a flow control valve of this type for a heater flow cycle of a motor vehicle, wherein the actuator of the flow control valve is disposed in the flowing heating medium. Due to the internally arranged actuator this valve is additionally configured very compact.

Cutoff and throttle valves are generally known in the art to which the invention pertains in a plurality of configurations as axial valve, axial cone valve or globe valve, as a lifting valve or lifting cone valve, as a slide valve or cutoff slide valve, ball valve or butterfly valve, for example, also from the product portfolio of the applicant. The axial or rotating position change of the closure element, a piston, a ball, a plate or a cone, adjusts and controls the flow of the pressure loaded fluid through the closure cross section of the valve.

Known cut off and throttle valves with a closure cross section that can be adjusted through an electric motor are traditionally often designed as angle type valves thus with a fluid flowing in perpendicular to the axis of the cone shaped closure element and perpendicular to the outlet direction, since this provides good access in installed condition for replacing wear parts and since the adjustment mechanism is mechanically comparatively simple.

Lately also throttle valves in an axial configuration, so called globe valves are being used increasingly, in particular where a change of a flow direction is undesirable, thus throttle valves with a closure element that is moveable coaxial to the inlet and the outlet direction. These closure valves additionally have smaller external dimensions for identical flow parameters and due to their coaxial configuration they also provide lower material loading caused by the flowing fluid and thus reduced wear.

Known cutoff and throttle valves use rotating armature motors which are also designated as torque motors with rotating moving elements "rotors" for actuators. The rotating motion of the moving element is transformed into a linear motion through moving threads sliding on one another according to the screw and nut principle. The component moved in a linear manner is either a spindle directly connected to the closure element, or, for example, in axial configuration a stem. In axial configuration the stem and the spindle are each provided with meshing bevel gears which facilitate a transformation of the linear movement.

A throttle valve in angle configuration is known from EP 0 937 928 A1, wherein the stator and the moving element of the electric actuator are separated by a divider wall which shields in particular the electrical connections of the actuator against an internal portion of the valve and against the influence of the fluid flowing through the throttle valve. The driving force is transferred onto the moving element through the divider wall. DE 39 33 169 A1 discloses a throttle valve in axial configuration at which the electric actuator is shielded from the fluid hermetically and pressure tight in a separate chamber. Only a shaft driven by the actuator and provided with a motion thread reaches from the chamber into the internal portion of the throttle valve and drives the piston shaped closure element.

DE 100 58 4441 A1 discloses a concept for a throttle valve in angular configuration, wherein the actuator is flanged to the valve body from the outside in a separate hermetically sealed housing and in turn only the shaft provided with a motion thread reaches into the inner portion of the throttle valve. Also in this valve the stator and the moving element are separated by a divider wall.

In oil and gas drilling and also in the chemical industry and also in other industries the requirements to ensure leak free operation continuously increase for safety and environmental protection reasons. The leakage of toxic fluids has to be avoided as a matter of principle at least within the technical options available. For cutoff and throttle valves in particular the tight support of stems is crucial.

In the field of offshore drilling for oil and gas increasingly process steps, for example, the compression of the drilled gas are moved directly to the drilling location at the ocean floor. This tendency causes an increasing need for components like, for example, valves which are suitable for underwater applications.

These components do not only have to be emission free for environmental protection reasons, thus they have to assure a shielding of the flowing fluid (oil, gas) from the surrounding sea water and they have to prevent an exit of the fluid into the ambient. Furthermore also a penetration of sea water which is highly corrosive and carries microorganisms into the valve itself or into the actuator has to be prevented under all circumstances. Eventually also any contact in particular of the electronics and of the mechanical components of the actuator with the drilled fluid is undesirable since it can be very aggressive due to contaminations with abrasive and corrosive components like sand, rust and in particular hydrogen sulfide.

The shielding of the voltage conducting components of the actuator against the flowing fluid and against the ambient and on the other hand side the resistance against the pressure conditions prevailing at the ocean floor can only be achieved with the concepts of known valves through reinforced, thus thicker divider walls and between the actuator and the ambient, the actuator and the inner portion of the valve or between stator and moving element of the actuator. In the latter case each increase of the gap between the stator and the moving element reduces the efficiency of the actuator.

On the other hand, the valve according to DE 42 14 814 A1 does not achieve any sealing of the mechanical components of the actuator against contaminants.

BRIEF SUMMARY OF THE INVENTION

It is the object of the invention to provide a valve with an actuator disposed in the fluid which can be used for fluids with abrasive and corrosive components.

Based on the known valves it is proposed according to the invention that the inner cavity of the actuator housing is separated from the fluid through a movable separation element. Thus, a penetration of fluid into the actuator, in particular between stator and moving element of the actuator is effectively prevented. Moving the separation element compensates volume changes in the interior. Such volume changes are caused, for example, by moving the spindle, by temperature changes, or by leakage of the dynamic seals between the inner cavity and the fluid. Using a pressure resistant, depending on the media, also media resistant stator and respective electrical connections facilitates omitting the divider wall between the stator and the moving element and thus facilitates a significantly increased efficiency of the actuator in particular for applications under high pressure.

Preferably, the closure element is axially moveable through the actuator in the actuator housing for a valve according to the invention. Valves of this type according to the invention are, for example, throttle or cutoff valves with a piston that is axially moveable, for example, in a cage or slide valves. Since the pressure of the fluid is effective at both ends of the spindle, the spindle is completely unloaded from pressure. Alternatively, the closure element at a valve according to the invention can be rotated by the actuator. 90° valves of this type according to the invention are, for example, ball valves or butterfly valves.

At a valve according to the invention preferably an inlet direction of the fluid into an inlet opening corresponds to an outlet direction of the fluid from the outlet opening and the closure element is movable coaxial to the inlet direction and the outlet direction. A valve according to the invention of this type in axial configuration is characterized by a small material loading through the flowing fluid. The actuation device, in particular the drive housing with the actuator of such a valve according to the invention is then disposed protected within the housing of the valve.

Alternatively, a valve according to the invention can also be produced in an angular configuration. The actuator is then mounted in the housing preferably, so that it is easily accessible for maintenance from the outside.

Advantageously, the divider element for a valve according to the invention is a compensation piston freely movable in a compensation cylinder or a bellows. The movement of the compensation piston or the bellows compensates volume changes in the inner cavity for a valve of this type according to the invention.

Advantageously, the compensation cylinder is disposed in a wall of the housing in a valve of this type according to the invention. A throttle valve of this type according to the invention has a particularly simple configuration. Alternatively, the compensation cylinder can form a portion of the drive housing and the compensation piston or the bellows can, for example, enclose a spindle axially that is connected with the closure element.

In a particularly advantageous manner the inner cavity of a valve according to the invention is filled with a liquid. The incompressible filling of the cavity simplifies configuring the valve according to the invention for changing pressure conditions. The liquid can be a lubricant. Thus, moving parts of the actuation device, in particular a transmission between a moving element and a spindle can be lubricated. When using self lubricating components the liquid can also be, for example, water. On the other hand side, the liquid provides explosion protection for the actuator. The divider element prevents a contamination of the liquid with the fluid and vice versa.

The liquid in the interior supports heat removal from the actuator, in particular from its stator. The liquid can be introduced through respective channels from the outside into the interior of a valve according to the invention. The liquid can is be changed in frequent intervals and can also be filtered continuously while in circulation. Visual checking or an automated chemical and physical checking of the condition of the fluid facilitates monitoring the wear condition of the valve of this type according to the invention.

In a valve according to the invention, in particular the moving element can be rotatable rotor, wherein a transmission transfers a rotating movement of the moving element into a translatoric movement of the spindle connected with the closure element. A valve of this type with a rotating armature motor as an actuator can be produced in a particularly cost effective manner, since actuators of this type, also configured as stepper motors, are commercially available in a plurality of embodiments. Alternatively, the actuator can be a linear motor also configured as a stepper motor, which directly drives the closure element through a spindle without transmission. The actuation device of a valve of this type is particularly small in size.

In such a valve according to the invention with an inner cavity filled with liquid, the liquid preferably flows through the transmission during a translatoric movement of the spindle. This assures on the one hand side good lubrication for the transmission, on the other hand side manufacturing is reduced through multiple uses of existing cavities. Alternatively or in supplemental manner, the liquid can also be introduced into the housing through small bore holes.

In an advantageous manner, the transmission for a valve according to the invention with a rotating armature motor is a rolling element screw. Rolling element screws are transmissions which are known in particular for machine tools for machining metal. Balls or threaded rods (Rollers) are being used for transferring a rotational movement into a translatoric movement, wherein the balls or threaded rods roll at least on the translatorically moved component. The rolling resistance of the rolling elements which is much smaller than the sliding resistance of threads facilitates a transmission with very small losses. The efficiencies of roller screws and ball screws are essentially comparable. Rolling element screws on the one hand side are configured much more compact than ball screws and on the other hand side facilitate a transmission of a translatoric movement into a rotation and vice versa.

Alternatively, the transmission for a valve according to the invention can be a movement thread on a spindle connected to the closure element, wherein the moving component is configured as a nut. Compared to a rolling element screw, a movement thread has higher losses, but it can be produced much more cost effectively. When an energy supply fails, the piston of a valve according to the invention of this type stays in its respective position.

Advantageously, a valve according to the invention has a safety device which moves the closure element into a safe position when a power supply fails. A valve according to the invention of this type facilitates safe operations also when the power supply fails.

In a particularly advantageous manner the safety device in a valve of this type according to the invention is an electrical system. A valve according to the invention can include an emergency power supply, in particular through a battery or a capacitor. A valve of this type according to the invention facilitates on the one hand side bridging power outages without assuming a safety position, and on the other hand side it facilitates defining different safety positions as a function of the particular application.

Alternatively, the safety device is a return spring. In a valve of this type according to the invention, the throttle cross section can be opened maximally in the safety position of the closure element. A valve according to the invention of this type can be used, for example, as a pump prevention valve in a bypass between an inlet and an outlet of a compressor.

Alternatively, the throttle cross section in the basic position of the closure element can be completely closed or it can be provided in any defined intermediary position for an electrically driven safety device as a function of the requirements for a particular application.

In a valve according to the invention with an inner cavity that is filled with liquid, the safety device can also be applied to the maintenance channel from the outside and can automatically pressurize the inner cavity with the liquid, for example, through a hydro pneumatic pressure accumulator in case a failure occurs and thus move the closure element into a safe position.

In a particularly advantageous embodiment, a valve according to the invention includes a position indicator which reports a position of the closure element. The position of the closure element in the valve, for example, of a piston in the throttle cage is a direct measure for the closure cross section and an indicative parameter for an operating position of the valve. A valve according to the invention can control, for example, the position indicator contact less through a permanent magnet and an electromagnetic encoder at one of the axially moved or rotated components.

Furthermore, the actuator for a valve according to the invention is configured corrosion resistant in an advantageous embodiment. A valve of this type according to the invention only places minor requirements on the environment of the actuator and facilitates extending maintenance intervals.

The actuator of a valve of this type according to the invention in particular preferably complies with NACE and ISO standards for corrosion protection in the oil and gas industry. Also for a leakage between the inner cavity and the fluid, in particular for a fluid penetrating the inner cavity, this prevents the actuator from being damaged.

Thus, for example, power conducting and magnetic components of the actuator can be embedded in a synthetic material.

A valve according to the invention can include a redundant stator for the actuator and/or redundant electrical or electronic components in order to increase safety.

Valves according to the invention facilitate handling in particular toxic fluids, thus fluids which are dangerous for the environment, humans or the climate not only in offshore oil and gas drilling, but, for example, also in petrochemical applications in nuclear facilities and in medical or pharmaceutical technology, for example, in hormone production. The complete integration of the actuator into the pressure loaded inner cavity of the valve improves safety against leakages and facilitates a significant extension of maintenance and replacement intervals.

BRIEF DESCRIPTION OF THE DRAWINGS

Two embodiments of the invention are subsequently described with reference to drawing, wherein.

DETAILED DESCRIPTION OF THE INVENTION

Figure 1:
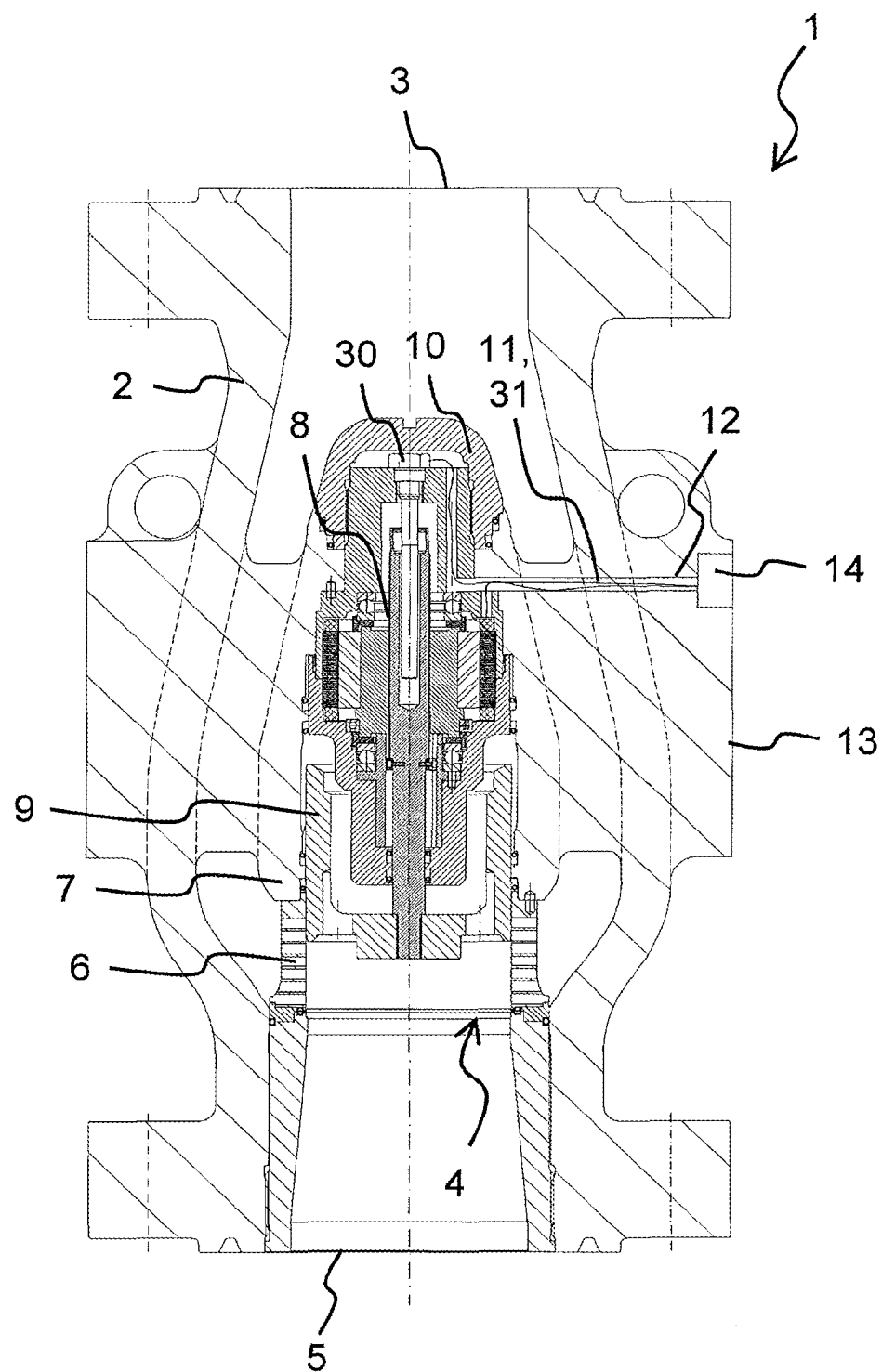
FIG. 1 illustrates a valve according to the invention in a sectional view.

The valve 1 according to the invention illustrated in FIG. 1 is a throttle valve in an almost completely open position. It includes a housing 2 with an inlet opening 3 for a fluid which is not illustrated at a first pressure level, a throttle 4 for throttling to a second pressure level and an outlet opening 5 for the throttled fluid. The valve 1 can also be operated with an opposite flow direction from the outlet opening 5 to the inlet opening 3.

The throttle 4 is configured as a tubular throttle cage 6 between a tubular inner body 7 connected with the housing 2 and the outlet opening 5, wherein the tubular inner body is disposed in the flow path of the fluid. A piston shaped closure element 9 is axially moveable in the throttle cage 6 through an electric actuation device 8. Towards the inlet opening 3, the inner body 7 is closed with a closing cap 10 screwed onto the actuation device 8.

The connection conduit 11 of the actuation device 8 is run through a conductor channel 12 from the inner body 7 to the outside 13 of the housing 2. The conductor channel is closed pressure tight with a closure plug 14 which includes electrical connections for the actuation device 8.

Figure 2:
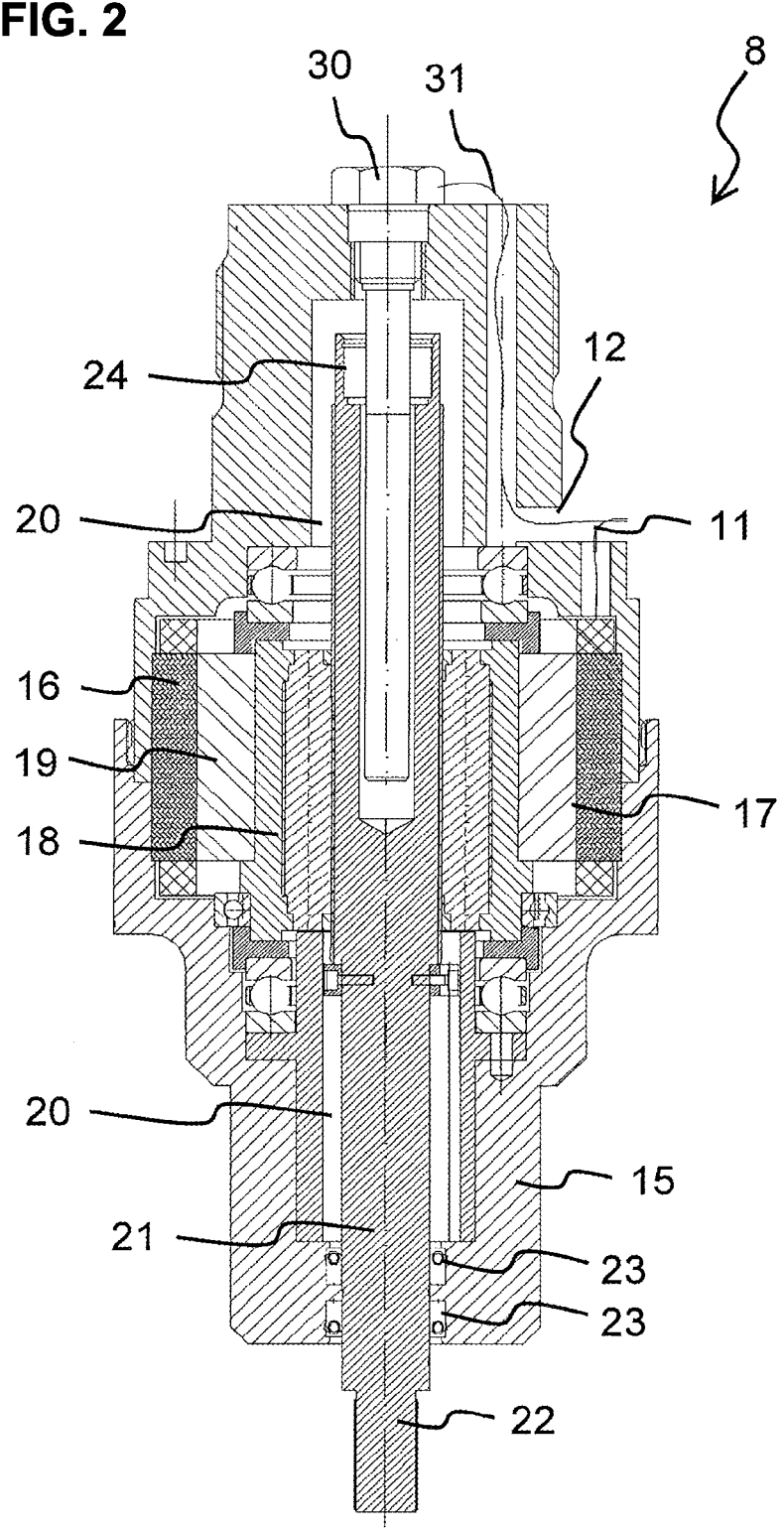
FIG. 2 illustrates an actuation device for the valve in a sectional view.

The actuation device 8 illustrated in detail in FIG. 2 includes a two component bolted together drive housing 15. In the drive housing 15, the stator 16 of a rotating armature motor used as an actuator 17 is fixated and a roller element screw 18 which is only schematically illustrated is supported in radial and in axial direction. The moving element 19 ("rotor") of the actuator 17 is connected torque proof with the rolling element screw 18.

The rolling element screw 18 in the inner cavity 20 of the drive housing 15 transfers the rotation of the moving element 19 into an axial translatoric movement of a spindle 21 whose end 22 is sealed in seals 23 and protrudes from the actuator housing 15 and is screwed together with the closure element 9. The inner cavity 20 is filled with a liquid lubricant which is not illustrated and which is at a pressure level that is below the second pressure level.

Figure 3:
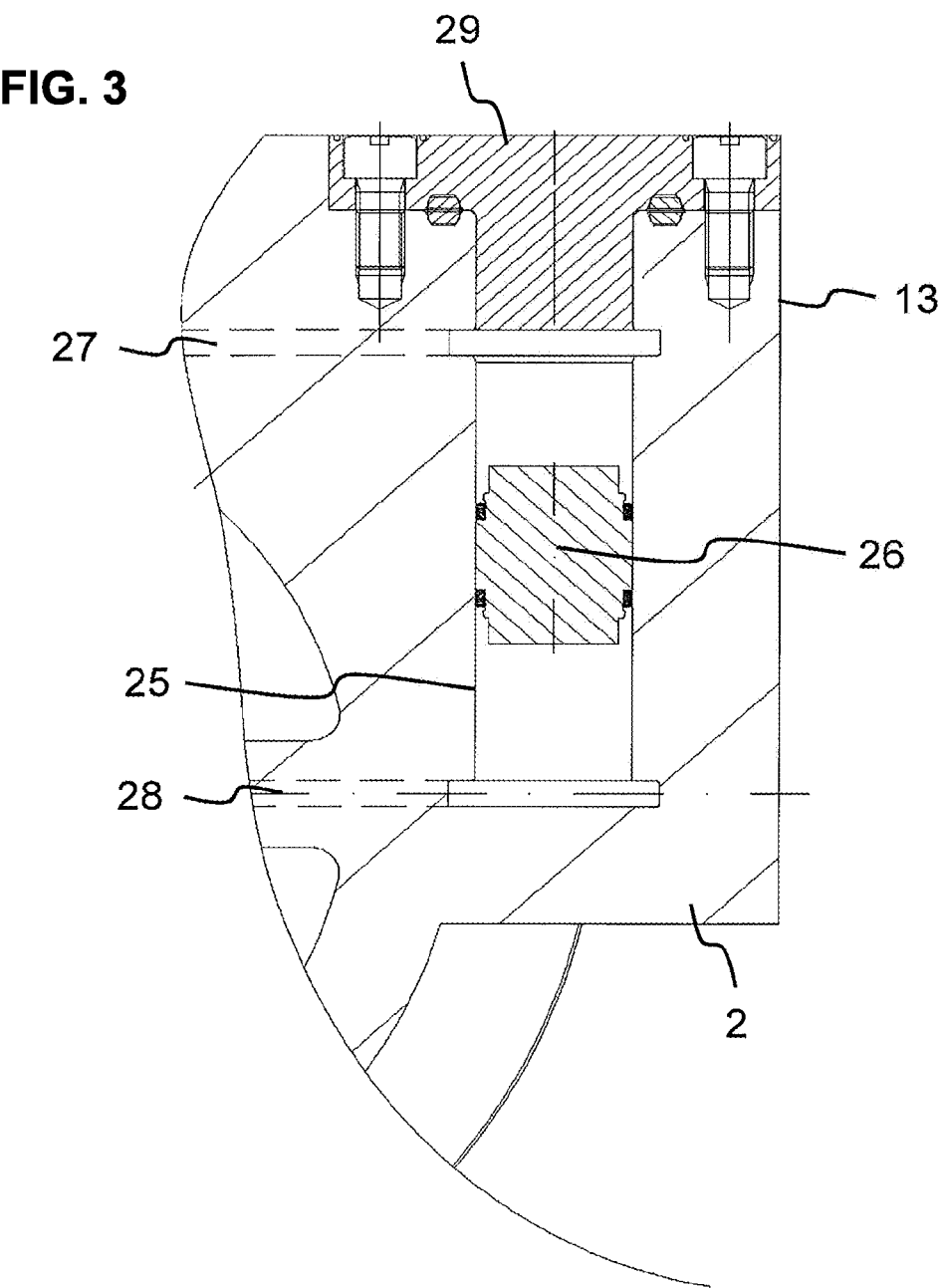
FIG. 3 illustrates a detail of the actuation device.

As illustrated in FIG. 3, the housing 2 includes a compensation cylinder 25 in a wall, wherein the compensation cylinder includes an axially freely moveable compensation piston as a divider element 26. The compensation cylinder 25 is loaded with the lubricant through a first channel 27 and loaded with the fluid through a second channel 28 and transmits the outlet pressure of the fluid onto the lubricant. The compensation cylinder 25 is closed with a screwed down plug 29 towards the outside 13 of the housing 2. The end 24 of the spindle 21 which end faces away from the closure element 9 is wetted by the lubricant. When closing the valve 1, lubricant is sucked from the compensation cylinder 25 through the first channel 27 to the distal end 24. This moves the divider element 26 accordingly in the compensation cylinder 25 and sucks the fluid into the compensation cylinder 25 through the second channel 28.

When opening the valve 1, on the other hand side the end 24 of the spindle 21 distal from the closure element displaces the lubricant from the inner cavity 20 and moves it through the first channel 27 into the compensation cylinder 25. The divider element 26 accordingly displaces the fluid through the second channel 28 from the compensation cylinder 25.

The valve 1 according to the invention includes a pullback spring (not illustrated) as a safety device and an electromagnetic position indicator 30 which signals the respective position of the closure element 9 through a connecting conductor 31 run through the conductor channel 12 in the closure plug 14 to a monitoring module which is not illustrated.

The actuator 17 and the rolling element screw 18 of the valve 1 can be configured corrosion resistant, also according to NACE and ISO standards for corrosion protection in oil and gas industry.

Figure 4:
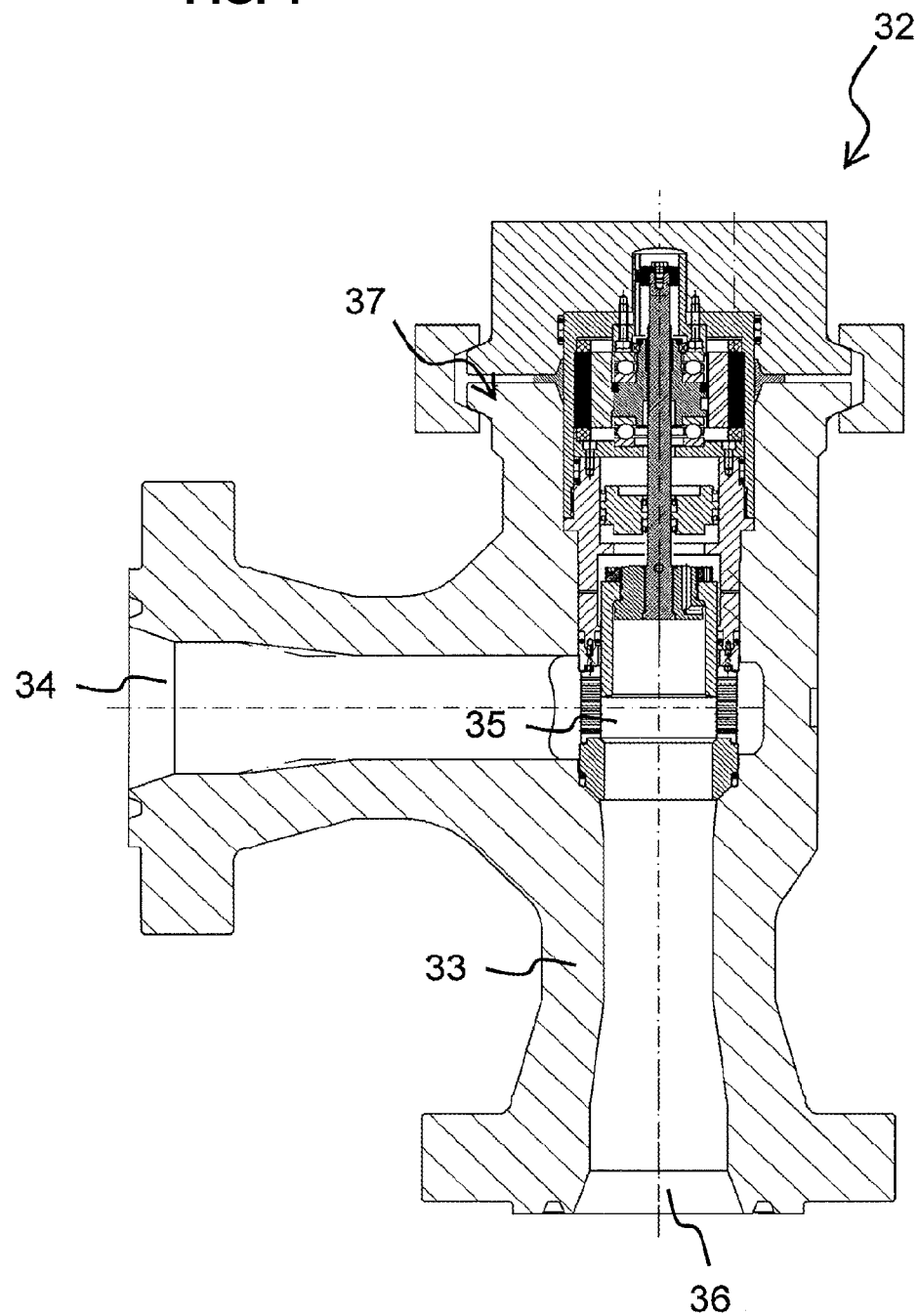
FIG. 4 illustrates a second valve according to the invention.

FIG. 4 illustrates a second valve 32 according to the invention, a throttle valve in angular configuration in turn in an almost completely opened position. The second valve 32 like the first valve 1 includes a housing 33 with an inlet opening 34 for a fluid which is not illustrated and which is at a first pressure level (the inlet pressure), a throttle 35 for throttling to a second pressure level (outlet pressure) and an outlet opening 36 for the throttled fluid.

Figure 5:
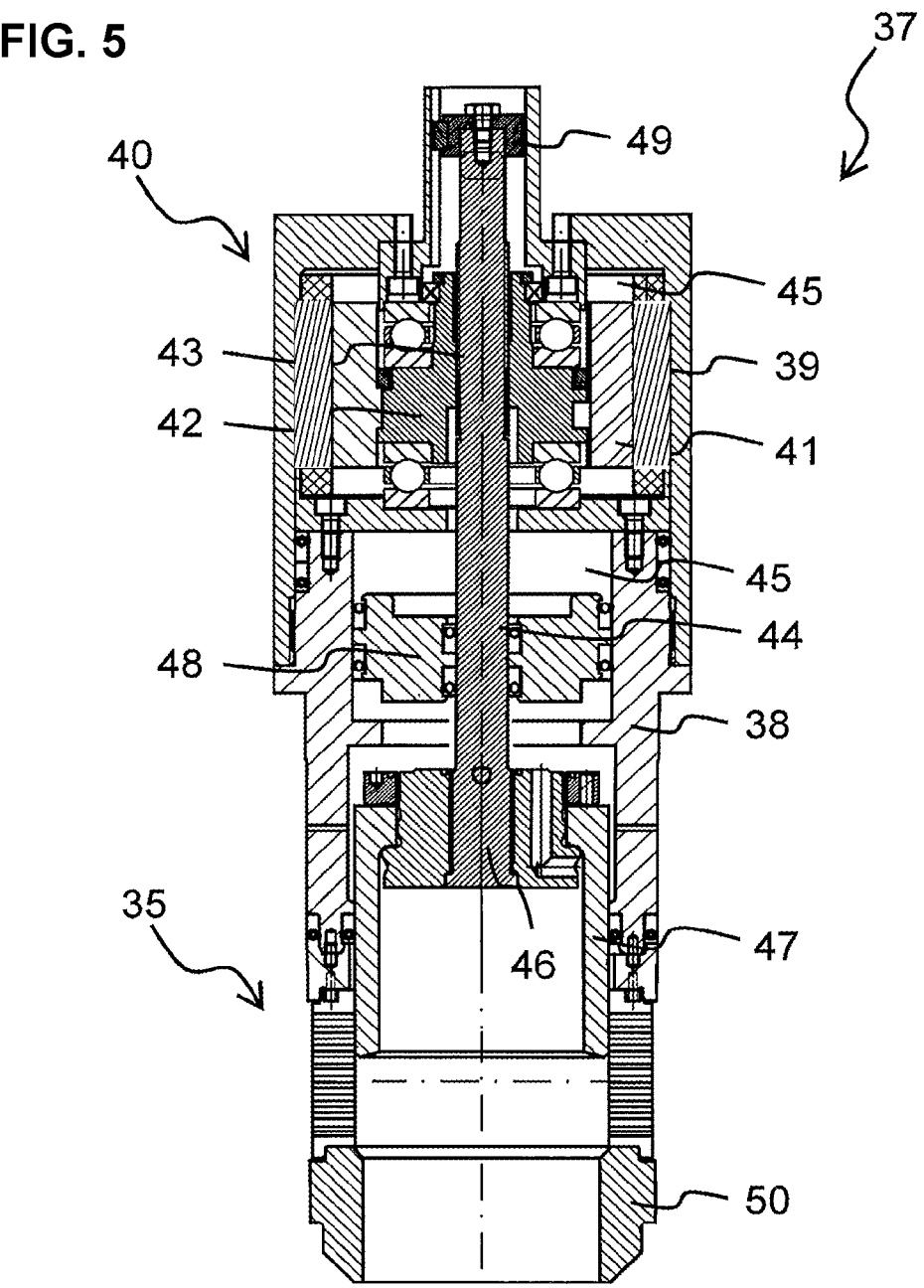
FIG. 5 illustrates the actuation device for the second valve.

The actuation device 37 of the second valve 32 according to the invention illustrated in FIG. 5 in detail includes a two component drive housing 38, which is screwed together. A stator 39 of an electric rotating armature motor which is used as an actuator 40 is fixated in the drive housing 38. A moving element 41 of the actuation device 40 is connected torque proof with a nut 42. The nut 42 runs on a movement thread 43 of a spindle 44.

The nut 42 in the inner cavity 45 of the drive housing 38 transposes the rotation of the moving element 41 into an axial translatoric movement of the spindle 44, whose end 46 protrudes from the drive housing 38 in a sealed manner and is screwed together with a piston shaped closure element 47. The inner cavity 45 is filled with a liquid lubricant below the second pressure level.

An axially freely moveable compensation piston is placed as a divider element 48 onto the spindle 44 between the nut 42 and the closure element 47, wherein the compensation piston on the one hand side insulates the inner cavity of the actuator 40 from the fluid, on the other hand side transmits the pressure of the fluid to the inner cavity 45 and the lubricant. Also in the second valve 32 the end 49 distal from the closure element 47 is wetted in its entirety by lubricant in the inner cavity 45.

The actuation device 37 can be configured as an integrated sub assembly which is also replaceable at the mounted valve 32 in one step when used on the ocean floor.

REFERENCE NUMERALS AND DESIGNATIONS 1 valve
2 housing
3 inlet opening
4 throttle
5 outlet opening
6 throttle cage
7 inner body
8 actuation device
9 closure element
10 closure cap
11 connection conduit
12 conduit channel
13 outside
14 closure plug
15 drive housing
16 stator
17 actuator
18 rolling element screw
19 moving element
20 inner cavity
21 spindle
22 end
23 seal
24 end
25 compensation cylinder
26 divider element
27 channel
28 channel
29 plug
30 position indicator
31 connection conduit
32 valve
33 housing
34 inlet opening
35 throttle
36 outlet opening
37 actuation device
38 drive housing
39 stator
40 actuator
41 moving element
42 nut
43 movement thread
44 spindle
45 inner cavity
46 end
47 closure element
48 divider element
49 end
50 terminal ring

What is claimed is:

1. A valve comprising:
a housing including an inlet opening for a fluid and an outlet opening for the fluid;
a closure element through which a flow of the fluid is controllable;
an actuation device including an electric actuator for adjusting the closure element;
a drive housing at which a stator of the electric actuator is fixated,
wherein the fluid is at an inlet pressure at the inlet opening and at an outlet pressure at the outlet opening,
wherein a moving element of the electric actuator is kinematically coupled with the closure element in an inner cavity of the drive housing,
wherein the inner cavity of the drive housing is filled with a liquid,
wherein the inner cavity of the drive housing is pressurized with a pressure from the fluid,
wherein the stator is disposed in the inner cavity of the drive housing,
wherein the inner cavity of the drive housing is separated from the fluid through a moveable divider element that is not kinematically coupled with the closure element, and
wherein the divider element is hydraulically moved by a distance greater than zero by an amount of the liquid when the amount is displaced from the inner cavity of the drive housing through an actuation of the actuation device when adjusting the closure element.

2. The valve according to claim 1, wherein the closure element is axially moveable in the housing and is repositioned by the electric actuator.

3. The valve according to claim 2,
wherein an inlet direction of the fluid into the inlet opening corresponds to an outlet direction of the fluid from the outlet opening, and
wherein the closure element is moveable in a coaxial manner relative to the inlet direction and the outlet direction.

4. The valve according to claim 1, wherein the moveable divider element is a compensation piston or a bellows which is freely moveable in a compensation cylinder.

5. The valve according to claim 4, wherein the compensation cylinder is arranged in a wall of the housing.

6. The valve according to claim 1, wherein the inner cavity of the drive housing is filled with a liquid.

7. The valve according to claim 1,
wherein the moving element is a rotor, and wherein a transmission converts a rotating movement of the moving element into a translatoric movement of a spindle connected with the closure element.

8. The valve according to claim 7, wherein the liquid flows through the transmission during the translatoric movement of the spindle.

9. The valve according to claim 7, wherein the transmission is a rolling element screw.

10. The valve according to claim 1, further comprising:
a safety device which moves the closure element into a safe position during a failure of a power supply,
wherein the safety device is a pullback spring.

11. The valve according to claim 1, further comprising:
a position indicator which signals a position of the closure element.

12. The valve according to claim 8, wherein the transmission is a rolling element screw.

13. A valve comprising:
a housing including an inlet opening for a fluid and an outlet opening for the fluid;
a closure element through which a flow of the fluid is controllable;
an actuation device including an electric actuator for adjusting the closure element;
a drive housing at which a stator of the electric actuator is fixated,
wherein the fluid is at an inlet pressure at the inlet opening and at an outlet pressure at the outlet opening,
wherein a moving element of the electric actuator is kinematically coupled with the closure element in an inner cavity of the drive housing,
wherein the inner cavity of the drive housing is filled with a liquid,
wherein the inner cavity of the drive housing is pressurized with a pressure from the fluid,
wherein the stator is disposed in the inner cavity of the drive housing,
wherein the inner cavity of the drive housing is separated from the fluid through a moveable divider element,
wherein the divider element is hydraulically moved by an amount of the liquid which amount is displaced from the inner cavity of the drive housing through an actuation of the actuation device when adjusting the closure element, and
wherein the inner cavity of the drive housing is pressurized with the outlet pressure from the fluid.

14. A valve comprising:
a housing including an inlet opening for a fluid and an outlet opening for the fluid;
a closure element through which a flow of the fluid is controllable;
an actuation device including an electric actuator for adjusting the closure element;
a drive housing at which a stator of the electric actuator is fixated,
wherein the fluid is at an inlet pressure at the inlet opening and at an outlet pressure at the outlet opening,
wherein a moving element of the electric actuator is kinematically coupled with the closure element in an inner cavity of the drive housing,
wherein the inner cavity of the drive housing is filled with a liquid,
wherein the inner cavity of the drive housing is pressurized with the outlet pressure from the fluid,
wherein the stator is disposed in the inner cavity of the drive housing,
wherein the inner cavity of the drive housing is separated from the fluid through a moveable divider element.

* * * * *